United States Patent [19]

Nelson

[11] 4,058,587

[45] Nov. 15, 1977

[54] PROCESS FOR REMOVING IMPURITIES FROM ACIDIC FLUID SOLUTIONS

[76] Inventor: Ernest William Nelson, 372 N. Algoma St., Postal Station (P), Thunder Bay, Ontario, Canada

[21] Appl. No.: 641,877

[22] Filed: Dec. 18, 1975

Related U.S. Application Data

[63] Continuation-in-part of Ser. No. 363,611, May 24, 1973, abandoned, which is a continuation-in-part of Ser. No. 66,878, Aug. 25, 1970, abandoned.

[51] Int. Cl.$^2$ .............................................. B01D 53/34
[52] U.S. Cl. .................................. 423/220; 423/159; 423/165; 423/234; 423/235; 423/242; 423/335; 423/419 P; 423/512 R; 423/512 A; 75/1 R; 75/101 R; 75/121; 210/42 R; 210/45; 210/59
[58] Field of Search ............... 423/220, 225, 234, 235, 423/419, 242, 512, 158, 162, 165, 166, 210, 535, 339, 432; 75/1, 21, 101, 121; 210/42 R, 45, 59

[56] References Cited

U.S. PATENT DOCUMENTS 3,882,221  5/1975  Wilson ................................. 423/244

Primary Examiner—Earl C. Thomas
Attorney, Agent, or Firm—Watson, Cole, Grindle & Watson

[57] ABSTRACT

A process is disclosed for removing impurities such as carbon dioxide, and sulfur dioxide from acidic fluid solutions using a serpentine material and producing a reaction product comprising recoverable metal values and finely divided silica. In accordance with the process, the serpentine material is slurried with water and is then mixed with an acidic fluid solution including at least one of $H_2CO_3$ and $H_2SO_3$. In particular, the acid material may be formed by contacting a gaseous component such as carbon dioxide or sulfur dioxide directly with water. A waste industrial gas containing carbon dioxide, sulfur dioxide, or a mixture of the two is an excellent source of gaseous components having utility in connection with this invention.

17 Claims, No Drawings

PROCESS FOR REMOVING IMPURITIES FROM ACIDIC FLUID SOLUTIONS

CROSS-REFERENCES TO RELATED APPLICATIONS

This application is a continuation-in-part application of my copending application Ser. No. 363,611, filed May 24, 1973, and now abandoned which application is a contiunation-in-part of my application Ser. No. 66,878, filed August 25, 1970, and now abandoned, and was copending therewith, in which priorty has been claimed from my Canadian patent application Ser. No. 72,967, filed Jan. 23, 1970. The entirety of said prior copending applications Ser. Nos. 66,878 and 363,611 are expressly incorporated into the present application by references.

BACKGROUND OF THE INVENTION

1. Field of the Invention

This invention relates to a process for removing impurities from acidic fluid solutions using a serpentine material and producing a reaction product therefrom comprising recoverable metal values and finely divided silica. More particularly, the invention relates to a process for removing impurities wherein the desired result is obtained by contacting the serpentine material with a weak acid such as $H_2CO_3$ or $H_2SO_3$. Even more specifically, the invention relates to such a purification process wherein an acid leach component is produced by contacting a waste industrial gas containing carbon dioxide and/or sulfur dioxide with water thereby reducing the air pollution which would otherwise result from the discharge of untreated waste industrial gases into the atmosphere.

2. Description of the Prior Art

A number of United States patent references were specifically discussed in the parent applications Ser. Nos. 66,878 filed Aug. 25, 1970, and 363,611, filed May 24, 1973, which applications have been specifically incorporated by reference into this application. In each instance, the reference was discussed and the differences between that reference and the present invention were outlined. Manifestly, the general state of the prior art is set forth in these references. Specifically, the references discussed in the parent applications are U.S. Ser. No. 717,864 to Jones; U.S. Pat. No. 1,266,731 to Westby; U.S. Pat. No. 2,386,337 to Moyer; U.S. Pat. No. 2,778,727 to Schaufelberger; U.S. Pat. No. 2,778,729 to Schaufelberger; U.S. Pat. No. 2,816,015 to Donaldson; U.S. Pat. No. 3,025,131 to Lerner; U.S. Pat. No. 3,085,861 to Thornhill; U.S. Pat. No. 3,243,262 to Carr et al.; U.S. Pat. No. 3,318,689 to Zubryckyj et al.; U.S. Pat. No. 3,338,667 to Pundsak; and U.S. Pat. No. 3,547,583 to Wilson.

Prior to discussing the prior art in detail, one problem with respect to a great deal of the prior art must be considered. That problem is the characterization of serpentine as a hydrous magnesium silicate as has been the case for many years. This has led to the reporting of the formula for serpentine as being $Mg_3Si_2O_7.2H_2O$. This is a misnomer and an incorrect statement of the formula. Most of those authorities who have considered the question lately have generally answered that the serpentine formula is $Mg_6(Si_4O_{10})(OH)_8$. Some of these quthorities report the formula to be $Mg_3Si_2O_5(OH)_4$. However, magnesium has a preferred coordination number of 6 with hydroxyl radicals; therefore, the unit mineral cell should contain six magnesium atoms.

The $(Si_4O_{10})$ in the modern formula indicates a high order polymeric layer type anion which has a tendency to cause sheetlike and flaky minerals and several minerals with this anion decompose in acids to give a solid silica residue. Serpentine decomposes to solid silica with acid. $(Si_2O_7)$ is only dimeric (2 units of discrete anions) and minerals with this anion tend to form silicic acid gels with acids. Serpentine does not give silicic acid gel with acid. Serpentine has been shown to be in sheetlike layers of $Mg(OH)_2$ attached to other sheetlike layers of $(Si_4O_{10})$ similar to kaolinite.

Furthermore, minerals with descrete anions like $(Si_2O_7)$ are characteristically hard, whereas serpentine is soft, indicating that it does not contain $(Si_2O_7)$.

The $(OH)_8$ in the modern formula indicates the presence of a powerful chemically active base. Powdered serpentine will almost immediately neutralize all acid and must contain a strong base. Serpentine on being heated to a high temperature of about 600° C. yields water which must come from "structural water" consisting of (OH) groups. When such water is forced out the mineral cannot be reformed by the addition of water, which is further evidence of hydroxyl.

The $(.2H_2O)$ in the older formula indicates the presence of water crystallization which are chemically neutral water molecules weakly coordinated to cations. They can be driven off the mineral at a low temperature of about 105° C. (just above the boiling point of water). Once driven off they can be easily replaced and the mineral will return to its original nature. This is common with zeolites. They also produce a gel with acid.

Serpentine must be heated to about 600° C. to drive off water. It then changes to olivene and silica and cannot be converted back to serpentine simply by adding water. The equation for this is

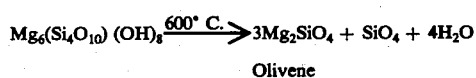

$$Mg_6(Si_4O_{10})(OH)_8 \xrightarrow{600° C.} 3Mg_2SiO_4 + SiO_4 + 4H_2O$$

Olivene

Together with its quick acting base nature, this confirms that serpentine contains (OH) hydroxyl groups and not $(.H_2O)$, water of crystallization.

Therefore, because of the presence of hydroxyl groups, serpentine should be classified as a hydroxide rather than as a hydrous magnesium silicate. Faulty classifications have caused a long misunderstanding of serpentine. The disclosure and emphasis in this patent application may assist in the development of many new uses for this abundant, unique substance in addition to the use to be discussed below.

Certainly, the beneficiation of serpentine ore materials is a well known and economically desirable process. Serpentine is decomposed specifically for the recovery of the magnesium metallic values therefrom and often the beneficiation process also results in the production of a finely divided silica material. Other, generally related mineral ores, such as garnierite, have also been subjected to beneficiating for the purpose of recovering metallic values. As is well known in the art, natural processes often cause ores, such as those mentioned above, to undergo a laterization process whereby the ores produced thereby are referred to as being laterities of the basic ore.

Specific discussions of laterities and processes for the beneficiation thereof are set forth in U.S. Pat. No. 3,318,689 to Zubryckyj et al., U.S. Pat. No. 3,244,513 to Zubryckyj et al. and in U.S. Pat. No. 3,146,091 to Green. As is known to the routinier in this art, laterities are residual weathered deposits produced as the result of long term weathering processes acting on primary serpentinites which generally constitute a mixture of serpentine, magnetite, sulfides and other minor materials. During the laterization process, the sulfides and magnetite are oxidized to hematite and limonitic iron minerals and the serpentine is often altered to a garnierite having a high nickel content. The deposits of the intimately mixed, nickel containing iron oxides often overlie the earthy and clayey garnierite material which, in turn, generally overlies the primary serpentinite. Laterite deposits form most easily under tropical conditions.

Although there are many such laterized deposits which are located in tropical countries, there are many more low-grade primary serpentinite deposits in the world which have not been subjected to the process of weathering, concentration of nickel and change in mineralization which characterize the laterization process.

As is clearly set forth in the Zubryckyj et al. and Green patents mentioned above, a prior heat treatment of the minerals, at temperatures in the order of 600°–850° C, is required. This is an extremely costly step which has the additional shortcoming of often causing serpentine materials to be converted into talc and olivine. Each of these latter materials is relatively insoluble as compared to serpentine and often is a complicating factor in the beneficiation thereof.

Moreover, the Zubryckyj et al. and Green processes require the use of expensive reducing agents which are used at the high temperatures so that dissolvable products may be produced. With respect to the dissolution step itself, the Zubryckyj et al. and Green processes each utilize sulfuric acid as the solvent. In this connection, it is to be noted that while Zubryckyj et al. suggest the use of sulfur dioxide in connection with the acid forming component, whenever sulfur dioxide is utilized, oxygen is also required and it is apparent that as a result, sulfur trioxide is produced; therefore, the acid component utilized in the Zubryckyj et al. process, is in fact sulfuric acid.

In the prior art processes discussed in the immediately preceding paragraphs, a relatively insoluble material is produced by the initial high temperature reductions required. Accordingly, leaching times of several hours are required even though in each process strong acids, such as sulfuric acid, are utilized.

In U.S. Pat. No. 2,788,729 to Schaufelberger, nickel and cobalt values are obtained from garnierite utilizing an acid leaching process. While Schaufelberger has recognized that sulfur dioxide does seem to have utility in connection with the beneficiation of garnierite, such utility becomes available only when the temperature and pressure conditions are such that the sulfur dioxide acts as a clathrate whereby the dissociation of the acid formed therefrom is increased to the point that the acid is capable of acting in the same manner as a strong acid. In this connection reference is made to *Advanced Inorganic Chemistry*, by Cotton and Wilkinson, John Wiley and Sons (1966), particularly at page 545.

In the first place, serpentine and garnierite are completely different materials with known and readily differentiable characteristics as shown in the following Table:

Secondly, although at first glance it seems that Schaufelberger U.S. Pat. No. 2,778,729 utilizes an acid material produced by dissolving sulfur dioxide in water to beneficiate garnierite, a complete reading of Schaufelberger's disclosure reveals that it is only when sulfur dioxide is utilized in combination with sufficiently elevated pressure and temperature conditions to create a clathrate, that the same can be utilized for beneficiating garnierite.

Many of the important characteristics and properties of the serpentine materials involved in the present application are discussed by Dana in his *Manual of Minerology*, John Wiley and Son (17th Ed. 1959), particularly at pp. 463 through 465.

TABLE

| Characteristic Properties | Serpentine | Garnierite |
|---|---|---|
| Formula Composition | $Mg_6(Si_4O_{10})(OH)_8$ | (Ni, Mg) $SiO_3 \cdot nH_2O$ |
| Crystallography | Prismatic, Monoclinic Fibrous, Crystals | Amorphous, Earthy Incrustation |
| Index of Refraction | 1.49 – 1.57 | 1.59 |
| Hardness | 2 – 5 (usually 4) | 2 – 3 |
| Lustre | Greasy, Silky Waxlike | Earthy, Dull |
| Color | Variegated, Mottled in light and Dark Shades of Green | Apple Green White |
| Tests | Decomposed by HCl -does not blacken when heated in closed tube | Difficultly Decomposed by HCl -Blackens when heated in closed tube |
| Varieties | Bastite, Common, Retinalite, Bowenlite, Picrolite, Antigorite Marmolite, Chrysotile, Radiotine | only Garnierite |
| Origin | A Deep Seated Mineral | A surface alteration product |

Dana indicates that serpentine is readily decomposed by the strong acid, hydrochloric acid. With respect to garnierite, Dana indicates that this material is decomposed only with difficulty by hydrochloric acid.

In accordance with the foregoing, it can be appreciated that the prior art processes for beneficiating serpentine ore materials all possess the common problem that strong acids and low pHs were required for beneficiating the serpentine ore material. Further, in many instances, prior to the present invention, it was believed by those of ordinary skill in this art that not only were strong acids required but also pretreatment of the ore and/or high temperatures and pressures during the dissolution process were absolutely requisite.

Turning now to the Wilson reference, it is disclosed that waste stack gases containing sulfur dioxide may be purified by a process in which the sulfur dioxide gas is entrapped by the metallic sulicates. Wilson suggests several available sources for the oxide and silicate materials including slag from reverberatory refining of copper pyritic type ores and "a great number of naturally occurring mineral substances." However, in each case Wilson specifically states that the starting material must be a mixture of metallic oxides and metallic silicates which are reactable with aqueous solutions of mineral acids to form salts and hydrates of silicic acid. Wilson's intent is to form either a gel containing chemically and physically combined sulfur dioxide or the system may be maintained in a liquid state by preventing dehydration of the dihydrated silicic acid.

All of the oxides described by Wilson as being suitable were previously known to be reactive against $SO_2$ acid. Most of them are soluble in water and do not occur as natural minerals except rarely, MgO as periclase. Silica gel was also known to absorb sulphur compounds. Water is also known to absorb $SO_2$ gas to form sulfurous acid. The conversion of dissolved $SO_2$ gas to sulfur by reduction with $H_2S$ is also well known.

Wilson's novelty (col. 2, line 21) lies in the use of a mixture of two classes of substances, reactive metallic oxides and metallic silicates or slag which can form a reactive gel with $SO_2$ acid which can be controlled to provide either a gel or a solution from which sulfur is produced by reduction. It is this control which is central to the teachings of Wilson.

Wilson's use of a slag reagent effectively provides a reactive metallic oxide and a silicate which produces a gel which can be controlled. If he uses a mixture of metallic oxides and natural metallic silicates, the natural metallic silicates must be those that produce a gel with $SO_2$ acid or his inventive control of the process is cancelled. A natural mineral silicate which does not produce a gel would be unsatisfactory because it would unnecessarily contribute only unwanted silicate ions or solid silica which would be detrimental because they would contribute an additional disposal problem.

For minerals to obtain simple ions like ($SiO_4$) which are capable of forming gels with acids, they must be formed at very high temperatures, like Olivine, which is a high temperature igneous mineral (1910° C.) and, therefore, does not contain such ions. Serpentine does not form such a gel.

Therefore, serpentine would be wholly unsatisfactory as Wilson's metallic silicate reagent. It is a type of silicate which does not produce a gel with sulfurous acid and would, at best, add unnecessary solid silica into Wilson's process. It is not a metallic oxide but an hydroxide.

Turning now to Wilson's use of a slag as a reactant in the process, slag is ordinarily produced by the combination (a mixture) of the gangue (silicate source) of the ore and the added flux (oxide source).

In copper refining slags, the gangue consists of silica and silicate minerals and the iron part of the sulfide ore minerals. The flux is usually calcium oxide. These are melted together at over 1100° C. and finally discarded where they quickly solidify.

Molten slag is similar to a geologists magma. However, on the very long slow cooling of a magma, chemical bonds form and reform until the most stable combinations crystallize into minerals. When a slag is quick frozen in a matter of hours, a glass is formed in which there are no crystals, but, rather, a substance consisting of individual separate ions. If finely ground-up they are free to react without the breaking of stable bonds. It is a super-cooled liquid state with the ions in a metastable state. Practically all the substances found in slags are salts or orthosilicic acid ($H_2SiO_4$) and metasilicic acid ($H_2SiO_3$). Iron oxide gives a very fusible slag.

In the ionic theory of slag, the dominant ion in slag is $(SiO_4)^{4-}$. The silica frameworks dissociate $$5SiO_2 = (Si_3O_{10})^{8-} + 2Si^{4+}$$

At higher temperatures the polymeric $(Si_3O_{10})^{8-}$ further dissociates to more $Si^{4+}$.

The basic oxides dissociate $$CaO = Ca^{2+} + O^{2-}$$

and in the presence of the $Si^{4+}$ $$Si^{4+} + 4O^{2-} = (SiO_4)^{4-}$$

$O^{2-}$ is a very powerful chemical base and slag owes its basicity to this ion. When slag is ground into a fine powder, contact with this ion becomes possible in its metastable condition. Because of the available $O^{2-}$, Wilson's use of slag as a reactant is a good idea to neutralize $SO_2$ acid. Also, because of the $(SiO_4)^{4-}$ present, a gel can be formed in $SO_2$ acid which apparently collects $SO_2$ substances. Slag is a good reactant also, because it is a cheap waste product. Negatively, it is hard and must be ground finely.

Conversely, serpentine is not slag-like, it is soft rather than hard. It contains no $(SiO_4)$ groups. Serpentine cannot form a gel in contact with an acid. Serpentine contains no $O^{2-}$ ion and cannot replace slag in Wilson's process.

SUMMARY OF THE INVENTION

The present invention has resulted from the discovery that serpentine materials may be readily dissolved in an aqueous medium by contacting the same with a relatively weak acid of the type produced by reacting a gaseous component such as carbon dioxide or sulfur dioxide and mixtures thereof with water. Further, it has been found that the acids produced, namely $H_2CO_3$ and $H_2SO_3$ are capable of beneficiating serpentine ores without necessity for either pretreatment of the ore of elevated temperatures and pressures during the beneficiation process itself.

The present invention is directed principally to a process for removing impurities such as carbon dioxide and sulfur dioxide from acidic fluid solutions using a serpentine material and producing a reaction product comprising recoverable metal values and finely divided silica. Briefly, the invention in its broadest aspect comprises forming an admixture of a serpentine material and water, the serpentine material being a heterogeneous mixture comprising primarily a magnesium hydroxide and silica. The admixture is mised with the acidic fluid solution to produce a solid consisting predominantly of at least one salt selected from the group consisting of magnesium sulfite and magnesium carbonate and silica and substantially pure water.

The acidic fluid solution to be treated by the process of the present invention are of at least the following three types: (1) waste industrial gases containing at least one gaseous component selected from the group consisting of sulfur dioxide and carbon dioxide either initially contacted with water or not; (2) waste industrial aqueous liquids of a slightly acidic nature having at least one of the foregoing components dissolved therein; and (3) purposefully mixed fluid solutions, either gaseous or liquid for beneficiating serpentine ores.

Hence, in one specific aspect, the invention is directed to a process for improving the quality of a waste industrial gas containing at least one acidic gaseous component selected from a group consisting of carbon dioxide and sulfur dioxide. This process comprises the formation of an admixture of a serpentine material and water and passing such waste industrial gas through the admixture.

In another specific aspect of the invention, a process for filtering a slightly acidic aqueous solution and neutralizing the same to a pH of substantially 7, and no higher, is contemplated. This process comprises forming a filter bed comprising a layer of a particulate serpentine material and passing the initially slightly acidic aqueous solution through the filter layer.

Manifestly, in connection with both of these aspects of the invention, essentially all of the acid material in the waste industrial fluids, either liquid or gas, is neutralized during the process whereby pollution of air or water which would otherwise result from the discharge of untreated waste industrial fluids into the environment is substantially reduced.

According to a still further aspect, the invention is a process for beneficiating serpentine ores. This process of the invention comprises forming an admixture of serpentine ore and water. The serpentine in the admixture is contacted with an acid material consisting essentially of an acid selected from the group consisting of $H_2CO_3$, $H_2SO_3$, and mixtures of the foregoing. Further, in accordance with one particular aspect of the invention, the acid material contacted with the serpentine mineral material is essentially the sole acidic component in contact therewith during the beneficiation process. In accordance with the process, a reaction product comprising recoverable metal values and finely divided silica, is produced. In a more specific aspect of the invention, the beneficiation process comprises mixing a gas which includes at least one component selected from the group consisting of carbon dioxide and sulfur dioxide directly with the admixture of serpentine and water. In another more specific aspect, the invention comprises the step of producing the acid material by contacting a gas, which may be a waste industrial gas, containing at least one gaseous component selected from a group consisting of carbon dioxide and sulfur dioxide with water.

Further objects, advantages and features of the invention will be apparent to those of ordinary skill in the art in the detailed description of the invention as set forth in the following specification.

DETAILED DESCRIPTION OF THE PREFERRED EMBODIMENTS

In accordance with the present invention, it has been discovered that serpentine materials may be dissolved by weak acids produced by the reaction of gaseous components such as carbon dioxide and sulfur dioxide with water. It has also been found that serpentine can be dissolved by such weak acids at ordinary pressure and temperature conditions, such as, for example, room temperature and atmospheric pressure. It is believed that this phenomena occurs because of the fact that serpentine is a substance consisting of layers of ionically bonded metallic ions and hydroxyl ions alternating with layers of covalently bonded silica. The layers are, it is believed, held together by weak hydrogen bonding between the hydroxyl groups and the non-bonding electron orbitals of the silica oxygen atoms.

It is theorized that the foregoing structural characteristics contribute to the production of a rock which is very soft and easily comminuted into a fine powder where the hydroxyl ions will be readily available for reaction, even with weak acids, to form water and produce readily recoverable metallic values in ionic or compound form. Fine silica separates out and the metallic values produced can be recovered utilizing methods well known to those skilled in this art.

In accordance with the foregoing, serpentine, therefore, can be considered a heterogeneous mixture comprising magnesium hydroxide and silica. The hydroxide fraction reacts with the weak acids to form water and dissolved ions or salts, and the silica fraction separates out as a finely divided solid.

More particularly, the process of the present invention consists of mixing a serpentine material with water and contacting directly the admixture with a weak acid producing gas such as carbon dioxide or sulfur dioxide. An acid is formed from the gaseous component which is immediately available to attack the serpentine material and form water. If the supply of the weak acid forming gaseous component is not interrupted, an equilibrium can be established so that the process may be operated on a continuous basis.

The product which results from the foregoing process often contains ions or salts of, in addition to magnesium, nickel, cobalt, chromium and precious metals. Manifestly the various materials can be separated by many known processes of if dissolved, they can be utilized in solution form. The solid residue, which readily separates from the solution, generally comprises finely divided silica.

It has also been found that the foregoing process can also be utilized to beneficiate ores containing oxides and sulfides, prior to subjecting the same to extraction by gravity, magnetic or flotation separations, by dissolving and ridding the same of any serpentine which may be present as a contaminant of the ore undergoing beneficiation.

Although a fluid containing components capable of forming weak acids upon contact with water can be deliberately produced by the oxidation of carbonaceous and sulfurous materials or the roasting of carbonates, it has been found that an ideal source of such components comprises the waste gases produced from a great variety of industrial operations which are presently discharged into the environment and cause air and water pollution. It is quite common for such waste industrial fluids, particularly to contain components such as carbon dioxide and sulfur dioxide. In fact, it should be appreciated that the major purpose of the present invention is, under circumstances, to reduce air pollution, particularly where the serpentine mineral material undergoing beneficiation is low in recoverable metal values. In this same connection, it should be recognized that the process of the present invention might also be utilized to neutralize acid solutions and waste acidic liquors containing $H_2CO_3$ and/or $H_2SO_3$. In this latter regard, the process is capable of providing a special unique function in that, because serpentine ores are basic solids insoluble in neutral water, a pH of substantially 7 is readily obtained since any excess basic material will be insoluble in water alone.

Magnesium bisulfite solutions, which constitute one of the possible products of the present process, can be utilized in the chemical process for production of cellulose from wood. Also the product of the present invention is an excellent source for the quantity production of magnesium metal and various magnesium chemicals.

In a preferred method of utilization of the present invention, nickel, a magnesium sulfite-sulfur dioxide solution, fine silica, nickeliferrous magnetite and nickel sulfides may be recovered by beneficiating a primary serpentinite ore containing 80-90 weight percent serpentine, 10–20 weight percent magnetite and minor oxides and 1–5% by weight nickel, copper and iron sulfides. The ore may have an overall nickel content averaging 0.3 weight percent or more. It is quite likely in such an ore that the nickel will be divided among the three phases, replacing magnesium sites in the serpentine, as nickel iron rims on magnetite and chromite, and as nickel sulfides.

In general, the most economical method for practicing the present invention is to merely pump sulfur dioxide gas into a slurry of the foregoing ore which has been pulverized. More specifically, the process involves the following methodology. First, the serpentinite is ground and is slurried with water while sulfur dioxide gas is pumped into the mixing vessel. When the pH of the system approaches 2, the reaction should be complete and the magnesium hydroxide portion of the serpentine, including any nickel that replaced magnesium sites in the serpentine, should be in solution. The reaction mixture is filtered and the filtrate, which possible contains nickel values available for recovery by standard methods, contains a strong solution of magnesium sulfite saturated with sulfur dioxide which could be utilized directly as a wood pulping liquor. Upon the addition of additional serpentine or by dilution of the production solution to a pH of 4 or more, the bulk of the magnesium sulfite contained therein should precipitate as a solid from the solution. This material could then be recycled by roasting to produce sulfur dioxide, for further use in the process, and magnesium oxide, a useful refractory material. The residue, which will amount to only about 40% of the original charge, will consist of a mixture of fine silica and magnetite, chromite and sulfide materials. These materials, can be separated utilizing conventional, well known, physical methods. For example, the manetite can be separated by magnetic concentration, the sulfides by flotation and the chromite by gravitational separation methods. The recovered particles should be a high grade material which is substantially uncontaminated with residual serpentine slime.

In connection with the foregoing process, a preferred method for the reaction of air pollution due to sulfur dioxide in flue gases would be simply to utilize the flue gases instead of the sulfur dioxide. The flue gas would be passed directly through a slurry of ground serpentine. If the reaction conditions provide a sufficient amount of time, any carbon dioxide in the flue gas will also be extracted.

A further process broadly included within the scope of the invention includes the use of beds of serpentine as filtration units in water treatment plants. Slightly acidic solutions may be neutralized to a pH of substantially 7, without danger of achieving a pH above 7, because the serpentine itself is soluble only in acidic solution. Further, other foreign substances and impurities would tend to be filtered out better than through a sand filter bed because the remaining reacting serpentine will have an ionic type distribution of charges on its surface as compared to only a covalent type surface on a bed of quartz. As the serpentine is used up, the fine silica produced will also, in all likelihood, be a more effective filter than the coarser present type natural sand filter.

Other specific examples illustrating the manner of practicing the present invention are set forth as follows:

EXAMPLE I 552 pounds of serpentine are ground and admixed with a sufficient amount of water to form a fluid slurry. 264 pounds of substantially pure carbon dioxide are bubbled through the slurry at a rate such that substantially all of the carbon dioxide is retained in the fluid admixture. The bulk of the metal values are released from the serpentine into the aqueous phase as metallic ions or as salts and finely divided silica is also formed. The metallic values and the silica precipitate can be recovered by conventional recovery methods. Further, any other type of nickel minerals remaining in the residue are recoverable by magnetic, gravitational and/or flotation methods.

EXAMPLE 2

In this Example, all of the procedures of Example I are followed except that in this case 384 pounds of substantially pure sulfur dioxide are substituted for the 264 pounds of substantially pure carbon dioxide utilized in Example I. The results of the Example are substantially the same in that the bulk of the metal values are released as ions in the aqueous phase or as salts and the silica is released from the serpentine in a finely divided form.

EXAMPLE 3

In this Example, air pollutants are removed from a waste gas mixture which may contain sulfur dioxide and/or carbon dioxide. In this instance, a relatively large quantity of ground serpentine is admixed with water to form a fluid slurry. The quantity utilized depends entirely upon the stoichemetric requirements of the air pollutants contained in the particular waste gas to be purified. From a kinetic point of view, sulfur dioxide will generally be entirely removed before removal of the carbon dioxide and it should be a simple matter to one skilled in the art to adjust the relative flow rates and vessel sizes sufficiently to achieve whatever results are desired. Where it is required only to remove sulfur dioxide from the waste gas mixture, then the rate of flow of the gas through the serpentine slurry can be much greater. Conversely, if it is desired to remove carbon dioxide from the waste gas mixture, it may be necessary to pass the waste gas through the slurry at a much slower rate. Manifestly, it may be possible to combine the results obtained through the use of this Example with the type of results to be obtained through the use of an example such as Example I above wherein the acid components from waste gases can be removed for the purpose of reducing air pollution and at the same time valuable metal values and finely divided silica can be recovered from the serpentine.

EXAMPLE 4

552 pounds of serpentine are ground to form a particulate material and slurried with water. The aqueous slurry is maintained at a temperature of 25° C and atmospheric pressure. It has been found that this slurry will absorb 264 pounds of carbon dioxide or 384 pounds of sulfur dioxide or a stoichiometrical proportional mixture of the two. It has been found that it is not at all detrimental if air and/or water vapor are included in the gaseous stream which contains the carbon dioxide or sulfur dioxide. As a result of such treatment, whatever nickel happens to be present in the serpentine is released in ionic form into the solution while the magnesium in the serpentine may be converted into solid magnesium sulfite or magnesium carbonate which precipitates in admixture with the silica produced during the reaction. The magnesium carbonate and/or magnesium sulfite may then be separated from the finely divided silica utilizing methods conventionally used by those skilled in this art for such purposes.

While there have been described what are considered to be preferred embodiments of the present invention, it will be obvious to those skilled in the art that various changes and modifications may be made therein without departing from the spirit of the invention as defined in the appended claims.

I claim:

1. A process for removing impurities from an acidic fluid solution, the acidic solution containing as impurities at least one acidic component selected from a group consisting of carbon dioxide and sulfur dioxide, which comprises forming an admixture of a serpentine material having the formula $Mg_6(Si_4O_{10})(OH)_8$ and water, the serpentine material being a heterogeneous mixture comprising primarily a magnesium hydroxide and silica, and mixing the acidic fluid solution with the admixture to produce a solid consisting predominately of at least one salt selected from a group consisting of magnesium sulfite and magnesium carbonate and silica and substantially pure water.

2. A process according to claim 1, wherein the acidic fluid solution is an aqueous liquid.

3. A process according to claim 2, wherein the aqueous liquid is a waste industrial liquid.

4. A process according to claim 2, wherein the aqueous liquid is formed by contacting a gas containing the at least one acidic component with water.

5. A process according to claim 4, wherein the gas is a waste industrial gas.

6. A process according to claim 1, wherein the acidic fluid solution is a gas.

7. A process according to claim 6, wherein the gas is a waste industrial gas.

8. A process according to claim 1, wherein there is further included the step of recovering metallic values from the solid.

9. A process for removing impurities from waste industrial gases, the waste industrial gases containing as impurities at least one acidic gaseous component selected from a group consisting of carbon dioxide and sulfur dioxide, which comprises forming an admixture of a serpentine material having the formula $Mg_6(Si_4O_{10})(OH)_8$ and water, the serpentine material being a heterogeneous mixture comprising primarily a magnesium hydroxide and silica, and passing the waste industrial gases through the admixture to produce a waste gas substantially free of the impurities, a solid consisting predominately of at least one salt selected from a group consisting of magnesium sulfite and magnesium carbonate and silica and substantially pure water.

10. A process according to claim 9, wherein the serpentine material has a hardness of 2 to 5 and an index of refraction of 1.49 to 1.57.

11. A process according to claim 9, wherein the acidic gaseous components, when mixed with water, form $H_2CO_3$ and $H_2SO_3$.

12. A process for removing impurities from waste industrial gases, the waste industrial gases containing as impurities carbon dioxide and sulfur dioxide, which comprises forming an admixture of a serpentine material having the formula $Mg_6(Si_4O_{10})(OH)_8$ and water, the serpentine material being a heterogeneous mixture consisting essentially of magnesium hydroxide and silica, and passing the waste industrial gases through the admixture to produce a waste gas substantially free of the impurities, a solid predominately containing magnesium salts and silica and substantially pure water.

13. A process according to claim 12, wherein the magnesium salts include magnesium sulfite.

14. A process according to claim 12, wherein the magnesium salts include magnesium carbonate.

15. A process for removing impurities from waste industrial gases, said waste industrial gases containing as an impurity carbon dioxide, which comprises forming an admixture of a serpentine material having the formula $Mg_6(Si_4O_{10})(OH)_8$ and water, the serpentine material being a heterogeneous mixture consisting essentially of magnesium hydroxide and silica, and passing the waste industrial gases through the admixture to produce a waste gas substantially free of impurities, a solid consisting predominately of magnesium carbonate and silica and substantially pure water.

16. A process for removing impurities from waste industrial gases, the waste industrial gases containing as an impurity sulfur dioxide, which comprises forming an admixture of a serpentine material having the formula $Mg_6(Si_4O_{10})(OH)_8$ and water, the serpentine material being a heterogeneous mixture consisting essentially of magnesium hydroxide and silica, and passing the waste industrial gases through the admixture to produce a waste gas substantially free of the impurities, a solid consisting predominately of magnesium sulfite and silica and substantially pure water.

17. A process for filtering a slightly acidic aqueous solution having an acidic component selected from a group consisting of $H_2CO_3$ and $H_2SO_3$ and neutralizing the same to a pH of substantially 7 comprising forming a filter bed comprising a layer of a particulate serpentine material having the formula $Mg_6(Si_4O_{10})(OH)_8$ and passing said solution through said layer.

* * * * *